(12) United States Patent
Peng et al.

(10) Patent No.: US 10,584,275 B2
(45) Date of Patent: Mar. 10, 2020

(54) COMPOSITIONS, SYSTEMS, AND METHODS FOR REMOVING IRON SULFIDE SCALE FROM OILFIELD COMPONENTS USING METHYL ACRYLATE

(71) Applicant: Halliburton Energy Services, Inc., Houston, TX (US)

(72) Inventors: Yang Peng, Kingwood, TX (US); Zhiwei Yue, Sugar Land, TX (US); Funian Zhao, Tomball, TX (US); Liu Shi, Houston, TX (US); Ronald Larry Hoppe, Calgary (CA); Liangwei Qu, Spring, TX (US); Chunfang Fan, Houston, TX (US)

(73) Assignee: Multi-Chem Group, LLC, Houston, TX (US)

( * ) Notice: Subject to any disclaimer, the term of this patent is extended or adjusted under 35 U.S.C. 154(b) by 92 days.

(21) Appl. No.: 15/560,033

(22) PCT Filed: Apr. 20, 2015

(86) PCT No.: PCT/US2015/026670
§ 371 (c)(1),
(2) Date: Sep. 20, 2017

(87) PCT Pub. No.: WO2016/171652
PCT Pub. Date: Oct. 27, 2016

(65) Prior Publication Data
US 2018/0072940 A1 Mar. 15, 2018

(51) Int. Cl.
*C09K 8/532* (2006.01)
*C08L 33/08* (2006.01)
(Continued)

(52) U.S. Cl.
CPC .............. *C09K 8/532* (2013.01); *C08L 33/08* (2013.01); *C23G 1/24* (2013.01); *C01G 49/12* (2013.01); *C09K 2208/20* (2013.01)

(58) Field of Classification Search
None
See application file for complete search history.

(56) References Cited

U.S. PATENT DOCUMENTS

| 4,032,360 A | 6/1977 | Sharp |
| 4,220,550 A | 9/1980 | Frenier et al. |

(Continued)

FOREIGN PATENT DOCUMENTS

| WO | 2002/008127 | 1/2002 |
| WO | 2008/157121 | 12/2008 |

(Continued)

OTHER PUBLICATIONS

International Search Report and Written Opinion for PCT Patent Application No. PCT/US2056/026670, dated Jan. 20, 2016; 9 pages.

(Continued)

*Primary Examiner* — Jeffrey D Washville
(74) *Attorney, Agent, or Firm* — Baker Botts L.L.P.

(57) ABSTRACT

The present disclosure relates to compositions, systems and methods for removing iron sulfide scale from a solid object, such as an oilfield component. The compositions include a carbon-carbon (C—C) double bond with an electron withdrawing group bonded to at least one of the double-bonded carbons.

18 Claims, 3 Drawing Sheets

(51) Int. Cl.
*C23G 1/24* (2006.01)
*C01G 49/12* (2006.01)

(56) References Cited

U.S. PATENT DOCUMENTS

| | | | |
|---|---|---|---|
| 4,351,673 | A | 9/1982 | Lawson |
| 4,762,626 | A | 8/1988 | Emmons et al. |
| 5,104,630 | A | 4/1992 | Holmes et al. |
| 7,398,824 | B1 | 7/2008 | Wang et al. |
| 8,673,832 | B2 | 3/2014 | Schmit et al. |
| 2003/0133827 | A1 | 7/2003 | Mattox |
| 2006/0019834 | A1 | 1/2006 | Melbouci et al. |
| 2007/0175635 | A1 | 8/2007 | Ke |
| 2009/0143252 | A1 | 6/2009 | Lehmann et al. |
| 2010/0099596 | A1 | 4/2010 | Trahan |
| 2011/0152153 | A1 | 6/2011 | Trahan |
| 2012/0080641 | A1 | 4/2012 | Relenyi |
| 2013/0281329 | A1 | 10/2013 | De Wolf et al. |
| 2014/0100142 | A1* | 4/2014 | MacEwan ................ C02F 5/14 507/219 |

FOREIGN PATENT DOCUMENTS

| | | |
|---|---|---|
| WO | 2013/152832 | 10/2013 |
| WO | 2016/105341 | 6/2016 |

OTHER PUBLICATIONS

Nasr-El-Din, H.A., et al., "Iron sulfide scale: formation, removal and prevention," SPE 68315, 13 pages., Jan. 2001.

Reed, C., et al., "Acrolein application to mitigate biogenic sulfides and remediate injection well damage in a gas plant water disposal system," SPE 93602, 9 pages., Feb. 2005.

Penkala, Joseph E., "Acrolein 2-propenal: A versatile microbiocide for control of bacteria in oilfield systems," NACE 04749, 24 pages., 2004.

Salma, T., et al., "Cost effective removal of iron sulfide and hydrogen sulfide from water using acrolein," SPE 59708, 8 pages., Mar. 2000.

Penkala, J.E., et al., "Acrolein application to mitigate biogenic sulfides and remediate injection well damage in a gas plant water disposal system," SPE 98067, 9 pages, Feb. 2006.

International Search Report and Written Opinion, Application No. PCT/US2015/026673; 9 pages., dated Jan. 7, 2016.

Office Action for Australian Patent Application No. 2015391990, dated Oct. 6, 2017; 5 pages.

Office Action for Norwegian Patent Application No. 20171483, dated Nov. 15, 2017; 5 pages.

Office Action for Norwegian Patent Application No. 20171483, dated Aug. 24, 2018; 5 pages.

* cited by examiner

COMPOSITIONS, SYSTEMS, AND METHODS FOR REMOVING IRON SULFIDE SCALE FROM OILFIELD COMPONENTS USING METHYL ACRYLATE

RELATED APPLICATIONS

This application is a U.S. National Stage Application of International Application No. PCT/US2015/026670 filed Apr. 20, 2015, which designates the United States, and is incorporated herein by reference in its entirety.

TECHNICAL FIELD

The present disclosure relates to compositions, systems, and methods for removing iron sulfide scale from a solid object, such as an oilfield component.

BACKGROUND

Iron sulfide scale commonly forms in the oilfield environment, particularly if there is water in the formation being drilled or used for production. Scale can cause equipment to break or perform sub-optimally and may also reduce production from a well. Iron sulfide scale is difficult to remove because of its low water solubility and its complex composition and structure. Conventional methods for removing scale in the oilfield setting involve chemicals with limited effectiveness, such as tetrakishhydroxymethylphosphonium salt (THPS) or chelate sequestrants. More effective chemicals, such as strong inorganic or organic acids or acrolein (2-propenal) are dangerous. For instance, acrolein has a very high acute toxicity, necessitating extremely careful handling.

BRIEF DESCRIPTION OF THE DRAWINGS

For a more complete understanding of the present invention and its features and advantages, reference is now made to the following description, taken in conjunction with the accompanying drawings, which are not drawn to scale, and in which.

DETAILED DESCRIPTION

Figure 1:
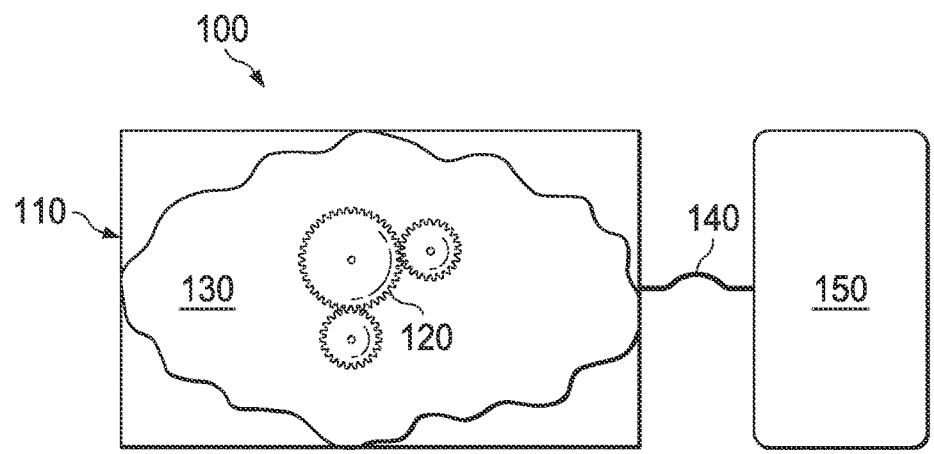
FIG. 1 presents a schematic diagram of a closed system for iron sulfide removal.

The present disclosure relates to compositions, systems, and methods for removing iron sulfide scale from a solid object. Specifically, the object may be an oilfield component.

Compositions of the present disclosure generally include a carbon-carbon (C—C) double bond with an $R^1$ group bonded to at least one of the double-bonded carbons. The $R^1$ group includes an electron withdrawing group. Both of the double-bonded carbons may be bonded to an $R^1$ group, or one of the double-bonded carbons may be bonded to hydrogen (H) instead. Typically, compositions in which both double-bonded carbons are bonded to an $R^1$ group may be more effective at removing iron sulfide scale than compositions with only one $R^1$ group and with H on the other double-bonded C.

Compositions of the present disclosure may thus have the following general structural formula:

wherein $R^1$ is an electron withdrawing group and $R^2$ is $R^1$ or H.

$R^1$ may, for instance, include an acetate ($C_2H_3O_2^-$) group; a nitrile (C≡N) group; a ketone group:

wherein $R^3$ is a carbon-containing group, such as an alkyl group, particularly a methyl ($CH_3$) group or a methyl-terminated group; or a acyl halide group:

wherein X is a halide, such as chlorine (Cl), bromine (Br), or fluorine (F). $R^1$ may further be selected so that the composition has a lower corrosion rate and/or lower toxicity than acrolein or a strong inorganic or organic acid.

For example, when $R^1$ includes a nitrile group and $R^2$ is H, the composition may have the following general structural formula:

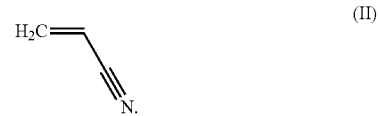

In another example, when $R^1$ includes a nitrile group and $R^2$ is the same as $R^1$, the composition may have the following general structural formula:

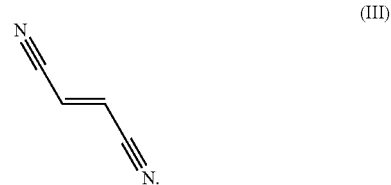

In another example, when $R^1$ includes an acetate group and $R^2$ is H, the composition may be methyl acrylate and may have the following general structural formula:

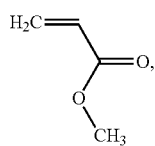
(IV)

or it may be a methyl-acrylate-containing composition, such as a composition with more than one acrylate group and, for example, the following general structural formula:

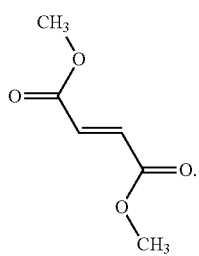
(V)

Although in these examples the electron withdrawing group is directly bonded to one of the double-bonded carbon atoms, spacer moieties, such as carbon chains, may also be present. These may allow the attachment of multiple electron withdrawing groups in the same $R^1$ group.

Although, for ease of synthesis, all electron withdrawing groups in an $R^1$ group will typically be the same, it is possible to have different electron withdrawing groups in an $R^1$ group. In addition, although, if $R^2$ is not H, it will typically be the same as $R^1$ also for ease of synthesis, it may differ from $R^1$, for instance by having different electron withdrawing groups. One of ordinary skill in the art may achieve the substitution of different electron withdrawing groups or different $R^1$ and $R^2$ groups on the carbon-carbon double bond backbone molecule by using blocking groups or other chemical synthesis techniques.

For instance, when $R^1$ contains an acetate group and $R^2$ is not H and is not the same as $R^1$, but is another electron withdrawing group, the composition may have the following general structural formula:

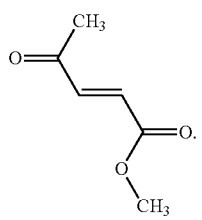
(VI)

Although typically synthesis conditions will yield primarily one type of molecule, it is possible to obtain a mixture of different molecules at times. For instance, synthesis conditions may yield a mixture of a) molecules in which $R^1$ and $R^2$ are the same and b) molecules in which $R^1$ is an electron withdrawing group and $R^2$ is H.

Ferric sulfide scale may be removed from a solid object, such as an oilfield component, using any composition described above or any combination of any compositions described above in the form of a removal material. The removal material may contain a composition or compositions of the present disclosure in an aqueous solvent or another polar solvent able to dissolve both the composition or compositions of this disclosure and iron and sulfide or any iron or sulfide-containing compounds produced by reaction of iron sulfide with the composition or compositions of this disclosure.

Ferric sulfide scale may have the general formula $Fe_xS_y$. The value of x and y may vary primarily due to the redox state of Fe, which may be 2+ or 3+. The ferric sulfide scale typically includes a mixture of molecules. For instance, iron sulfide commonly contains one or more of the following: pyrrhotite, ($Fe_{1-x}S$), troilite (FeS), mackinawite ($Fe_{1+x}S$), pyrite or marcasite ($FeS_2$), or greigite ($Fe_3S_4$).

Removal may be accomplished by breaking the iron sulfide into component ions, which are then dissolved in the removal mixture or by forming a compound containing a component of a composition or compositions of this disclosure and iron or sulfide. The amount of scale removed from solid object may be at least 80%, at least 90%, at least 95%, or substantially all of the iron sulfide scale.

The solid object may include any oilfield component on which iron sulfide scale accumulates. For instance, it may include a component with movable parts whose movement is hampered by the iron sulfide scale or a component with a fluid passageway that is blocked by iron sulfide scale. Specific oilfield components from which iron sulfide scale may be removed include perforations, casing, production tubulars, valves, pumps, such as electric submersible pumps, and downhole completion equipment, such as safety equipment and gas lift mandrels.

Iron sulfide scale may be removed from a solid object by exposing the object to a removal material for a length of time sufficient to remove all or a pre-determined amount of iron sulfide scale. A pre-determined amount may be the amount sufficient to allow the solid object to fulfill its intended function for a selected period of time. The length of time may vary depending upon the composition of the removal material, the concentration of the compound or compounds according to this disclosure in the removal material, the amount of iron sulfide scale to be removed, and the removal material and iron sulfide scale temperature, among other factors. Removal may take place at atmospheric pressure, or at an elevated pressure resulting from removal material being stored in a pressurized container.

Appropriate removal material composition and length of time for the removal process may be determined by conducting tests such as those described in the following examples designed to mimic the iron sulfide scale to be removed and removal conditions.

Although compositions of the present disclosure are generally safer than conventional iron sulfide removal materials, protective measures and equipment may still be put in place during the removal process in order to protect personnel and/or the environment and/or to recover removal materials and removed scale.

For instance, the removal process may be conducted in a closed system 100, such as that depicted in FIG. 1. Sealed container 110 may solid object 120 and removal material 130 to avoid release of removal material 130, which may be a liquid or a gas. Removal material 130 may be provided to sealed container 110 via a connector 140. Removal material 130 may be stored in a pressurized container 150 or in another suitable vessel. Connector 140 may also further contain various pressurized manifolds, hoses, and/or fittings (not shown) to transfer removal material 130 to sealed container 140. Sealed container 110 may contain applicators (not shown) that direct removal material 130 to particular areas of solid object 120. Closed system 100 may further contain leak-proof chemical pumps, metering equipment, and a purge subsystem to remove removal material 130 from sealed container 110 (all not shown) as suitable for use with a particular solid object 120 and removal material 130.

Figure 2:
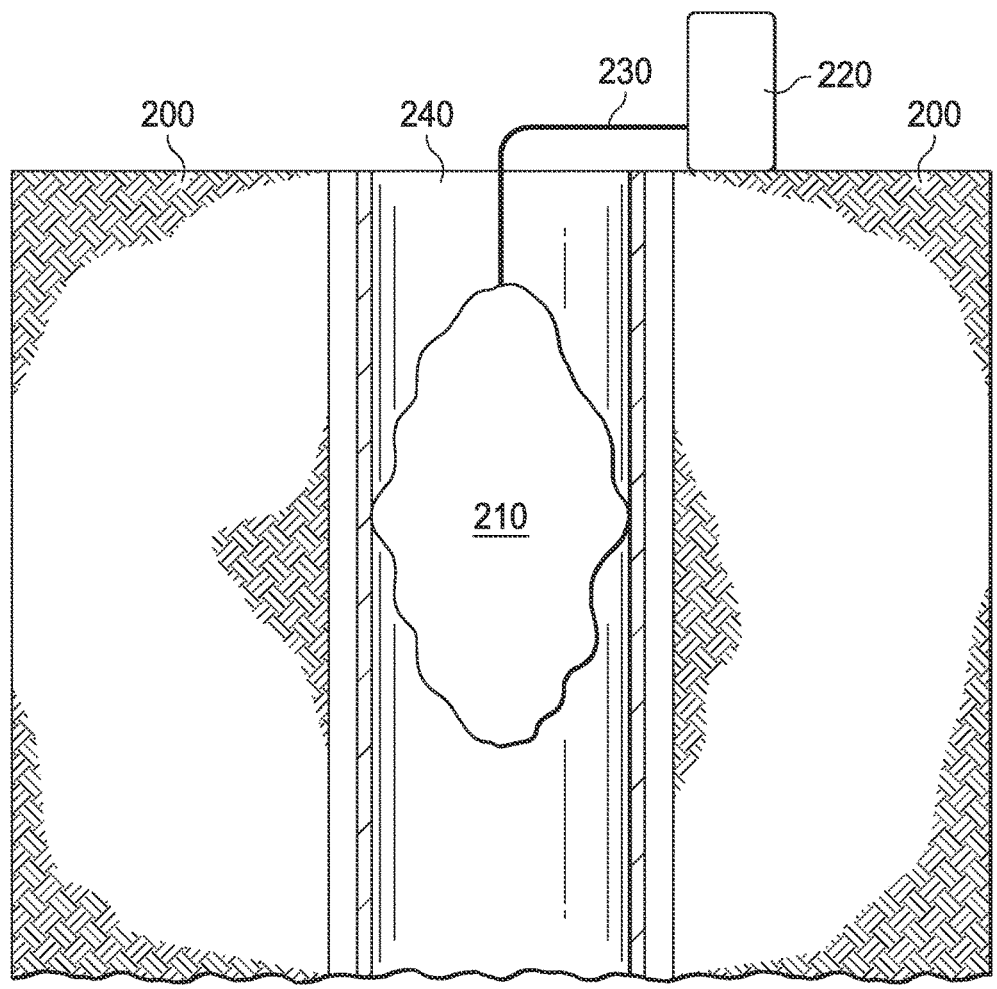
FIG. 2 presents a schematic diagram of a system for iron sulfide removal from a tubular in an oil or gas well.

The present disclosure also provides a system and method for improving production from an oil and gas well by removing iron sulfide scale from a tubular located in the well using a removal material, thereby improving oil or gas flow through the tubular. For example, as shown in FIG. 2, system 200 may contain removal material 210 in a sealed container 220, which may be a pressurized container. Connector 230 allows the removal material to flow from container 220 to tubular 240, where it removed iron sulfide scale. Connector 230 may contain applicators (not shown) that direct removal material 210 to particular areas of tubular 240. Closed system 200 may further contain leak-proof chemical pumps, metering equipment, and a recapture subsystem to capture removal material 210 from tubular 240.

In an embodiment A, the disclosure provides a method of removing iron sulfide scale from an oilfield component with iron sulfide scale, by applying to the oilfield component a removal material comprising a composition with the general structural formula (I). $R^1$ is an electron withdrawing group and $R^2$ is $R^1$, hydrogen (H) or a carbon (C)-containing group. The removal material is applied in an amount and for a time sufficient to remove iron sulfide scale from the oilfield component.

In an embodiment B, the disclosure provides a system for removing iron sulfide scale, the system containing the removal material from embodiment A and a system for applying the removal material to the oilfield component in an amount and for a time sufficient to remove iron sulfide scale from the oilfield component.

Embodiments A and B may be combined with one another or with any of the following additional elements, which may also be combined with one another: 1) the removal material may include at least two distinct compositions with the general structural formula I, 2) $R^1$ may include an acetate group, 3) $R^1$ may include a nitrile group; The method of claim 1, wherein $R^1$ comprises a ketone group with the following general structural formula:

wherein $R^3$ is a carbon-containing group.

6. The method of claim 5, wherein $R^3$ is an alkyl group.
7. The method of claim 1, wherein $R^1$ comprises an acyl halide group having the following general structural formula:

wherein X is a halide.

4) the removal material may further include a polar solvent; 5) the polar solvent may include water; 6) at least 80% of the iron sulfide scale may be removed from the oilfield component; 7) applying may occur in a sealed container; 8) the removal material may be recovered; 9) the oilfield component may include a perforation, a casing, a production tubular, a valve, a pump, or downhole completion equipment with iron sulfide scale; 10) the composition may have the general structural formula II; 11) the composition may have the general structural formula III; 12) the composition may be methyl acrylate or a methyl acrylate-containing composition; 13) the composition may have the general structural formula IV; 14) the composition may have the general structural formula V; 15) the composition may have the general structural formula VI; 16) the removal material may include an additional composition able to remove iron sulfide scale from the oilfield component; 17) the system for applying the removal material may include a sealed container; 18) the system for applying the removal material may further include a subsystem for recovering the removal material; 19) the oilfield component may include a tubular and the system for applying the removal material to the oilfield component may include a container to house the removal material and a connector to supply the removal material to the tubular; 20) the container may be a pressurized container; 21) the oilfield component may be placeable in a container and the system for applying the removal material to the oilfield component may include a sealed container in which the oilfield component is placed, a container housing the removal material, and a connector to supply the removal material to the sealed container; 22) the container housing the removal material may be a pressurized container.

EXAMPLES

The following examples further illustrate embodiments of the disclosure and ways to determine appropriate systems and methods of removing iron sulfide scale with a removal material. They are not intended to and should not be interpreted to encompass the entire scope of the invention.

Example 1

Figure 3A:
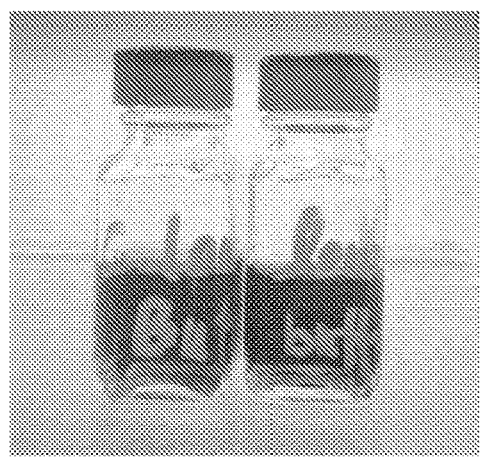
FIG. 3 presents results from an iron sulfide removal test immediately upon addition of a removal material (FIG. 3A), and after ten minutes (FIG. 3B)
Figure 3B:

A removal material containing a composition of formula II was prepared and added to water containing 10 ppm iron and 100 ppm sulfide, which mimics iron sulfide scale. At the time the removal material was added, the water was black due to the presence of iron sulfide as shown in FIG. 3A. After 10 minutes at 50° C., atmospheric pressure, and a pH of 7-8, the sample to which the removal material was added was white, as shown in the right bottle in FIG. 3B, while the untreated water remained black, as shown in the left bottle in FIG. 3B. This shows that the removal material containing a composition with formula II is able to react with iron sulfide in a manner that would result in its removal from a solid object.

Example 2

Figure 4A:
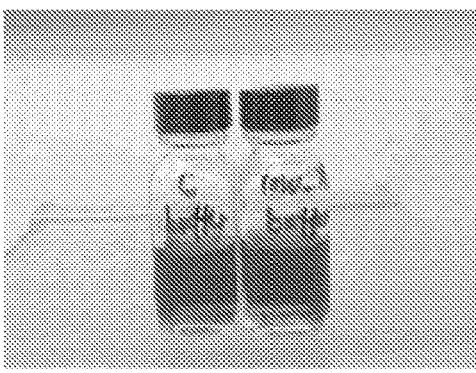
FIG. 4 presents results from an iron sulfide removal test immediately upon addition of another removal material (FIG. 4A), and after ten minutes (FIG. 4B)
Figure 4B:
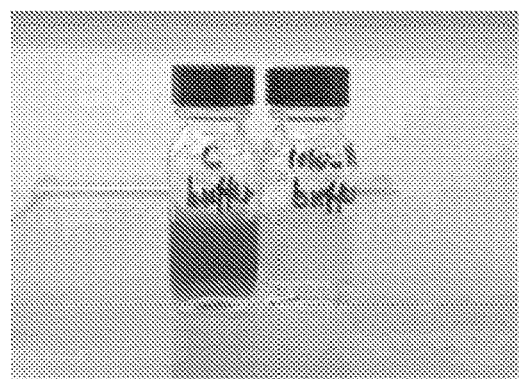

A removal material containing a composition of formula III was prepared and added to water containing 10 ppm iron and 100 ppm sulfide, which mimics iron sulfide scale. At the time the removal material was added, the water was black due to the presence of iron sulfide as shown in FIG. 4A. After 10 minutes at 50° C., atmospheric pressure, and a pH of 7-8, the sample to which the removal material was added was white, as shown in the right bottle in FIG. 4B, while the untreated water remained black, as shown in the left bottle in FIG. 4B. This shows that the removal material containing a composition with formula III is able to react with iron sulfide in a manner that would result in its removal from a solid object.

Example 3

Figure 5A:
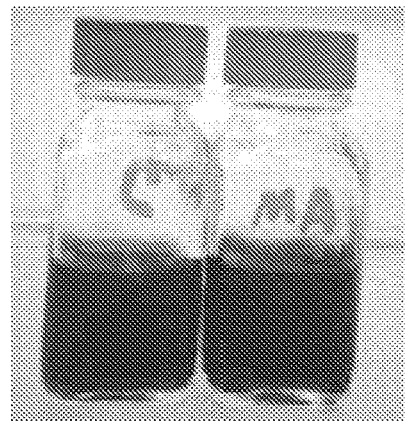
FIG. 5 presents results from an iron sulfide removal test immediately upon addition of yet another removal material (FIG. 5A), and after thirty minutes (FIG. 5B).
Figure 5B:
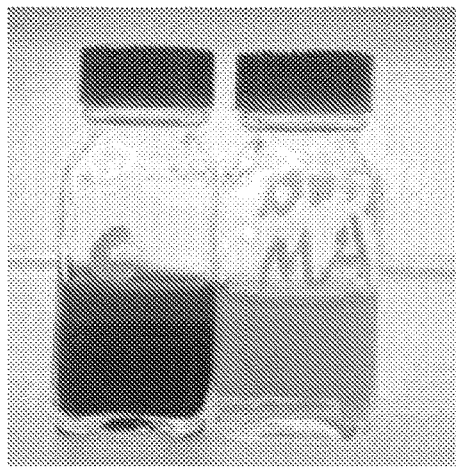

A removal material containing a composition of formula IV was prepared and added to water containing 50 ppm iron and 200 ppm sulfide, which mimics iron sulfide scale. At the time the removal material was added, the water was black due to the presence of iron sulfide as shown in FIG. 5A. After 30 minutes at 50° C., atmospheric pressure, and a pH of 7-8, the sample to which the removal material was added was white, as shown in the right bottle in FIG. 5B, while the untreated water remained black, as shown in the left bottle in FIG. 5B. This shows that the removal material containing a composition with formula IV is able to react with iron sulfide in a manner that would result in its removal from a solid object.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. For instance, although the compositions and mixtures of compositions described herein are adequate to remove iron sulfide scale on their own, they may also be mixed with conventional materials.

The invention claimed is:

1. A method of removing iron sulfide scale from an oilfield component with iron sulfide scale, the method comprising applying to the oilfield component a removal material comprising a methyl-acrylate containing composition of the general structural formula:

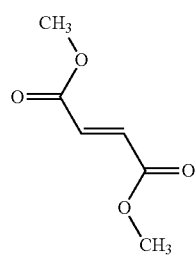

(V)

in an amount and for a time sufficient to remove iron sulfide scale from the oilfield component.

2. The method of claim 1, wherein the removal material further comprises a polar solvent.

3. The method of claim 1, wherein the removal material further comprises an additional composition able to remove iron sulfide scale from the oilfield component.

4. The method of claim 1, wherein at least 80% of the iron sulfide scale is removed from the oilfield component.

5. The method of claim 1, wherein applying occurs in a sealed container.

6. The method of claim 1, further comprising recovering the removal material.

7. The method of claim 1, wherein the oilfield component comprises a perforation, a casing, a production tubular, a valve, a pump, or downhole completion equipment with iron sulfide scale.

8. A system for removing iron sulfide scale from an oilfield component with iron sulfide scale, the system comprising:
a removal material comprising a methyl-acrylate containing composition of the general structural formula:

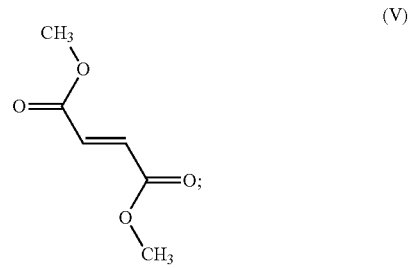

(V)

and
a system for applying the removal material to the oilfield component in an amount and for a time sufficient to remove iron sulfide scale from the oilfield component.

9. The system of claim 8, wherein the removal material further comprises a polar solvent.

10. The system of claim 8, wherein the removal material further comprises an additional composition able to remove iron sulfide scale from the oilfield component.

11. The system of claim 8, wherein at least 80% of the iron sulfide scale is removed from the oilfield component.

12. The system of claim 8, wherein the system for applying the removal material comprises a sealed container.

13. The system of claim 8, wherein the system for applying the removal material further comprises a subsystem for recovering the removal material.

14. The system of claim 8, wherein the oilfield component comprises a perforation, a casing, a production tubular, a valve, a pump, or downhole completion equipment with iron sulfide scale.

15. The system of claim 8, wherein the oilfield component comprises a tubular and the system for applying the removal material to the oilfield component comprises a container to house the removal material and a connector to supply the removal material to the tubular.

16. The system of claim 15, wherein the container is a pressurized container.

17. The system of claim 8, wherein the oilfield component is placeable in a container and the system for applying the removal material to the oilfield component comprises a sealed container in which the oilfield component is placed, a container housing the removal material, and a connector to supply the removal material to the sealed container.

18. The system of claim 17, wherein the container housing the removal material is a pressurized container.

* * * * *